US 6,739,552 B2

(12) United States Patent
Sankrithi et al.

(10) Patent No.: US 6,739,552 B2
(45) Date of Patent: May 25, 2004

(54) SIDE WALL SUPPORTED ARMREST FOR AIRCRAFT

(75) Inventors: Mithra M. K. V. Sankrithi, Federal Way, WA (US); Mark A. Stadum, Marysville, WA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 09/997,836

(22) Filed: Nov. 29, 2001

(65) Prior Publication Data

US 2003/0098391 A1 May 29, 2003

(51) Int. Cl.⁷ .............................................. B64D 11/06
(52) U.S. Cl. ............................. 244/118.6; 244/122 R
(58) Field of Search ........................ 244/118.6, 122 R; 296/63, 64; 105/345

(56) References Cited

U.S. PATENT DOCUMENTS

| | | | | |
|---|---|---|---|---|
| 2,310,573 A | * | 2/1943 | Burton ..................... | 244/118.6 |
| 2,332,841 A | * | 10/1943 | Burton et al. ............. | 244/118.6 |
| D155,777 S | * | 11/1949 | Butler ........................... | 43/68 |
| 4,674,713 A | * | 6/1987 | Ryan et al. ............... | 244/122 R |
| 4,723,732 A | * | 2/1988 | Gorges ..................... | 244/118.6 |
| 5,562,331 A | | 10/1996 | Spykerman et al. ... | 297/188.16 |
| 5,816,650 A | | 10/1998 | Lucas, Jr. .................. | 297/188.1 |
| 5,845,965 A | | 12/1998 | Heath et al. ........... | 297/188.19 |
| 6,012,679 A | | 1/2000 | Auestad .................... | 244/118.6 |
| 6,264,273 B1 | | 7/2001 | Waters, Sr. .............. | 297/188.14 |

* cited by examiner

Primary Examiner—J. Woodrow Eldred
(74) Attorney, Agent, or Firm—Shimokaji & Associates, P.C.

(57) ABSTRACT

An apparatus and method is disclosed for increasing available space in an aircraft cabin cross section to improve passenger comfort. Use of one side wall supported armrest on each side of the aircraft's cross section, rather then seat supported armrest as are provided conventionally elsewhere, enables use of wider seats. Side wall supported armrests may be secured by means of rails or other conventional mounting means, and the armrests may be contoured an/or cushioned to provide a better ergonomic arm support. Contoured armrests may also be recessed into the space between aircraft cabin body frames.

15 Claims, 4 Drawing Sheets

SIDE WALL SUPPORTED ARMREST FOR AIRCRAFT

BACKGROUND OF THE INVENTION

The present invention generally relates to apparatus and methods for accommodating passengers in aircraft and, more specifically, to apparatus and methods for passenger seating arrangements which enable wider seats and aisles through the use of side wall supported armrests rather than seat supported armrests for passengers seated closest to the side wall of aircraft cabins.

Space is a precious and highly valued commodity in a passenger aircraft cross section. One way to increase space is by increasing the cross sectional size of an aircraft, but if that becomes too large, it adds to undesirable empty weight and drag of the aircraft, and significantly increases costs. Within a cross section which is optimized for weight and drag, the challenge is to fit as many passengers as possible, while also maximizing the passenger comfort provided by the seats. For example, FIG. 1 is a partial cross sectional view of a typical main deck 10 of a Boeing 747 type passenger aircraft. As illustrated, ten abreast economy-class seats are provided by means of two triple seating units 12 (only one of which is shown) each located adjacent the aircraft's side walls, two aisles 16 (only one of which is shown) and two centrally located double seating units 14. Including armrests 18, on either side of each single seat 20, for a typical economy class installation, the illustrated main deck has ten seats 20, each with a 17.2 inch seat bottom width 22 (seat bottom width is an industry measure of passenger comfort), armrest widths 24 of 2 inches, and two aisles 16 each having an aisle width 26 of 19.5 inches.

In the past there have been numerous concepts developed to address and improve passenger comfort on aircraft. One approach to increasing seat bottom width is to decrease aisle width to undesirably narrow dimensions. The result, however, is tighter and more uncomfortable aisles, particularly from the standpoint of servicing aircraft passengers using standard food and beverage carts, and from the standpoint of ease of use by boarding and deplaning passengers with carry-on baggage.

Another technique used to provide wider seats for aircraft involves use of convertible seats. U.S. Pat. No. 6,012,679 to the assignee of the present invention, discloses a means whereby selected seat rows for wide body aircraft have seat groups that expand or contract to change the number of seats in a row and the seat width. Conversion is accomplished with all seat components remaining attached to their respective frames, so that no detachable units have to be stowed. The invention only works on specific cross sections under specific load factor conditions and involves substantial weight and cost penalties.

In various present and past passenger transport vehicle applications, armrests have been located on side walls or on access doors, but not as enabling means for increasing seat bottom widths. For example, it is common practice for passenger automobiles to have armrests attached to or integrally molded to doors or internal walls. That design approach is employed for practicability and ease of production rather that for the purpose of increasing passenger seating space. If seat mounted armrests were to be used for such applications, the result would be to impede ingress and egress, creating a possible safety problem. Additionally, for most passenger automobiles, more than adequate seat bottom width is available without the need for specially positioned armrests.

On many passenger aircraft, such as the Boeing 737 model, seat mounted armrests are not used for seats immediately adjacent overwing canopy doors and various TYPE 3 emergency exits. In such cases, the armrests are usually integral to the doors or emergency exit panels. The reason is to satisfy strict FAA safety requirements rather than the possible resulting gains in seat bottom widths.

The present inventive concept differs materially from the above cited prior art examples in that it is directed specifically to passenger aircraft applications and specifically for the purpose of increasing seat bottom widths.

As can be seen, there is a need for an improved apparatus and method which provides wider seats and/or aisles for aircraft passenger seating comfort within a given cross section without sacrificing other passenger comfort elements and without the need to incur substantial weight, drag, and cost penalties.

SUMMARY OF THE INVENTION

In one aspect of the present invention, there is disclosed an aircraft passenger abreast seating arrangement, comprising two aisles, two triple passenger abreast seating units outboard of these two aisles, a quadruple passenger abreast seating unit between these two aisles, and seat mounted armrests on both sides of all seats except the outboard sides of the most outboard (e.g., "window") seats. A side wall supported armrest is located adjacent the most outboard seat. Said side wall supported armrest may be continuous or individualized, may be contoured and cushioned for ergonomic purposes, and may be recessed into the contoured area between aircraft body frames. Use of the side wall supported armrest provides additional usable width on each side of an aircraft's cross section, allowing an increase in seat bottom widths.

In another aspect of the present invention, there is disclosed an aircraft passenger abreast seating arrangement, comprising: two triple passenger abreast seating units; a quadruple passenger abreast seating unit; two aisles; a seat mounted armrests on all but the outboard side of the outboard seat of each of the triple passenger abreast seating units; and one side wall supported armrest for use by the passenger occupying the outboard seat of each of the triple abreast seating units. Use of the inventive side wall supported armrest provides additional usable width on each side of an aircraft's cross section, allowing increased seat bottom widths.

In yet another aspect of the present invention, there is disclosed a passenger abreast seating arrangement, comprising a plurality of seats including seat mounted armrests on all but the outboard sides of each outboard seat. One armrest is mounted on the side wall for use by the passenger occupying each outboard seat of the passenger abreast seating arrangement, thus providing additional usable width on each side of an aircraft's cross section, allowing increased seat bottom widths.

In yet another aspect of the present invention, there is disclosed a method of increasing the usable width on each side of an aircraft's cross section, by means of the following steps: mounting passenger armrests on both sides of each seat of two triple and one quadruple passenger abreast seating units except for the outboard side of the most outboard seat; mounting one armrest on the aircraft's side wall adjacent the outboard seat of the triple abreast seating units; recessing the passenger arm rest into the contoured area between aircraft body frames; and, providing additional usable width on each side of an aircraft's cross section by eliminating one seat mounted armrest, thus allowing an increase in seat bottom width.

These and other features, aspects and advantages of the present invention will become better understood with reference to the following drawings, descriptions and claims.

DETAILED DESCRIPTION OF THE INVENTION

The present invention generally provides an innovative way to enable increased comfort and seat bottom width for seating arrangements such as the main deck of a Boeing 747, or other types of passenger aircraft which may range in size from 747 or larger twin-aisle airliners down to much smaller single-aisle airliners such as 717 or 737 aircraft or regional jets. This is unlike some prior art, which can sacrifice other aspects of passenger comfort and/or can result in substantial weight and cost penalties.

Figure 2:
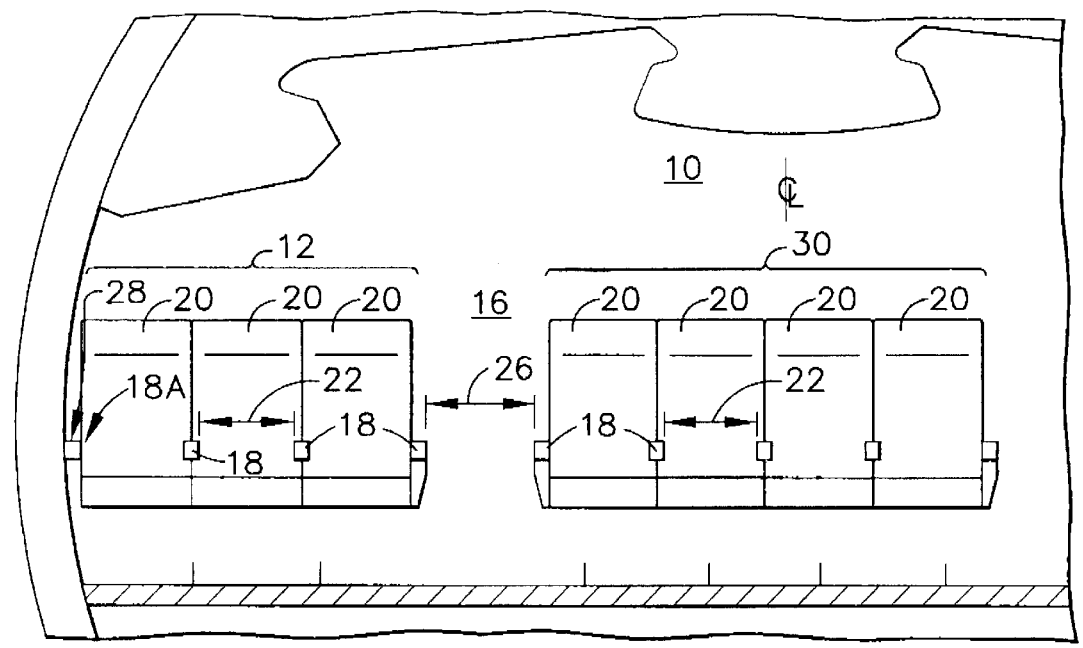
FIG. 2 is a partial cross sectional view of a Boeing 747 type passenger aircraft main deck showing the inventive seating arrangement.

Referring again to the accompanying drawings (in which like reference numerals indicate like parts throughout several views), and in particular to FIG. 2, there is shown a partial cross sectional view of a Boeing 747 main deck 10 illustrating the inventive seating arrangement, wherein the conventional outermost armrests 18A may be eliminated from the triple seating units 12. Instead, side wall supported armrests 28 may be provided on each side wall of the aircraft. FIG. 2 illustrates only one side of the aircraft. The opposing side may be similarly equipped. It is further contemplated that the side wall supported armrests may be suitably cushioned and/or contoured employing practices known to those skilled in the art. The space normally occupied by the outboard armrests 18A may thus become available for increasing seat bottom widths 22. Additionally, elimination of the outboard armrests 18A may make it possible to locate the triple seating units 12 closer to the aircraft's side wall, with a further gain in seating space.

Figure 1:
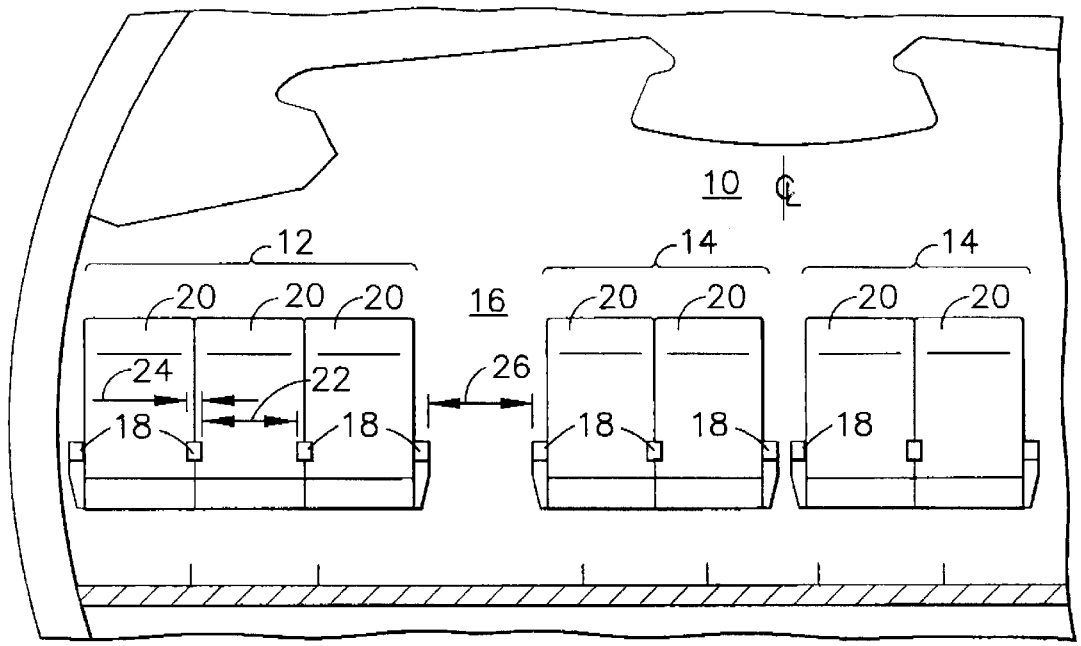
FIG. 1 is a partial cross sectional view of the main deck of a Boeing 747 type passenger aircraft illustrating a typical prior art seating arrangement.

FIG. 2 also illustrates use of a quadruple seating unit 30 for the center seating section of the aircraft. The quadruple seating unit 30 may replace the two double seating units 14, illustrated in FIG. 1. In so doing, one of the seat mounted armrests 18 located between the two double seating units 14, may be eliminated with a further resultant gain in available seating space.

By elimination of the seat mounted armrests 18A, by replacement of the two double seating units 14 with quadruple seating units 30, and by reducing aisle widths 26 from the current 19.5 inches to an acceptable 17.5 to 18 inches, seat bottom widths 22 for all ten abreast seats 20 may be increased to a very comfortable 18 inches from a previous 17.2 inches, in the illustrated embodiment shown in FIG. 2.

Figure 3:
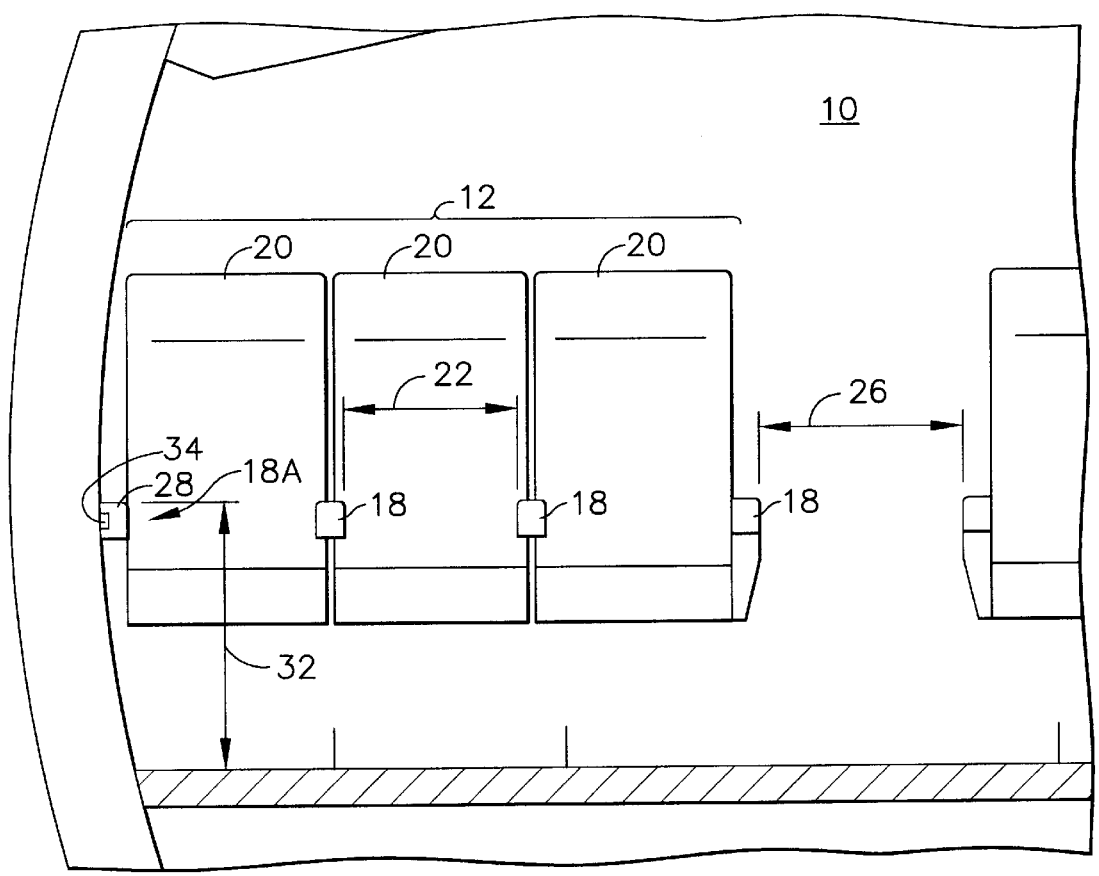
FIG. 3 is a magnified cross sectional view of a Boeing 747 type passenger aircraft main deck showing details of the inventive side wall mounted armrest.

Referring now to FIG. 3, there is shown a magnified cross sectional view of a Boeing 747 main deck 10 showing the left side triple seating unit 12, including three conventionally configured armrests 18. The conventional fourth armrest 18A has been replaced by a side wall supported armrest 28, which is placed at substantially the same armrest height 32 as conventional armrests 18. For one of the contemplated embodiments, the side wall supported armrest 28 may be secured to the aircraft's side wall by means of a side wall mounting track 34, similar conceptually to conventional seat tracks on which seat units are mounted to the cabin floor of an aircraft. The design of said seat tracks is well known to those skilled in the art. As indicated above, the side wall supported armrest 28 may be suitably cushioned and/or contoured for passenger comfort. The inventive side wall supported armrest 28 may provide additional space to allow for 18 inch seat bottom widths 22 using 18 inch wide aisle widths 26.

Figure 4:
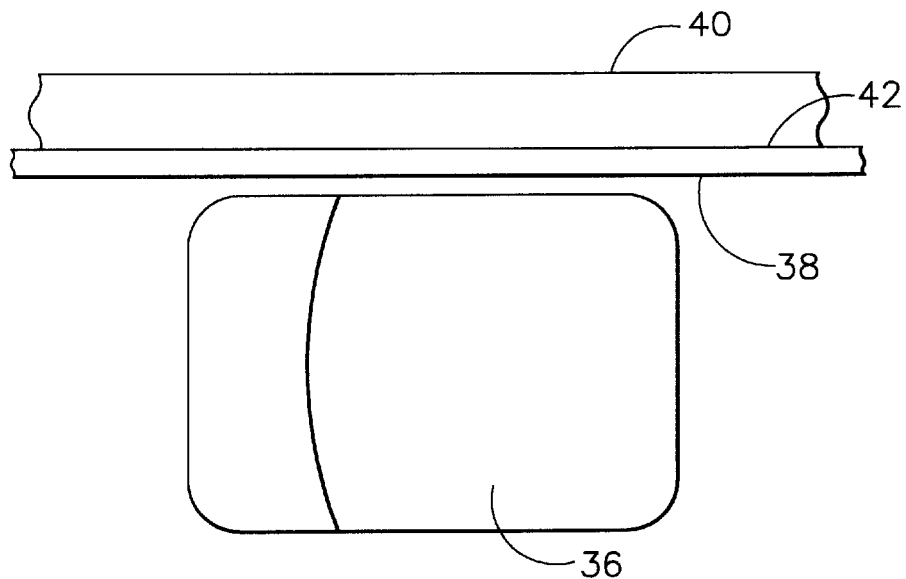
FIG. 4 is a partial plan view of the main deck 10 of a passenger aircraft showing one embodiment of the inventive side wall mounted armrest.

FIG. 4 is a partial plan view of the main deck 10 of a passenger aircraft showing the airplane's outer skin 40 and side wall 42 adjacent to which is shown a top view of an outermost seat 36. The illustrated embodiment may include a continuously running armrest 38 secured to the side wall 42 by means of conventional fasteners well known to those skilled in the art. The continuously running armrest 38 may also be suitably cushioned and/or contoured for passenger comfort.

Figure 5:
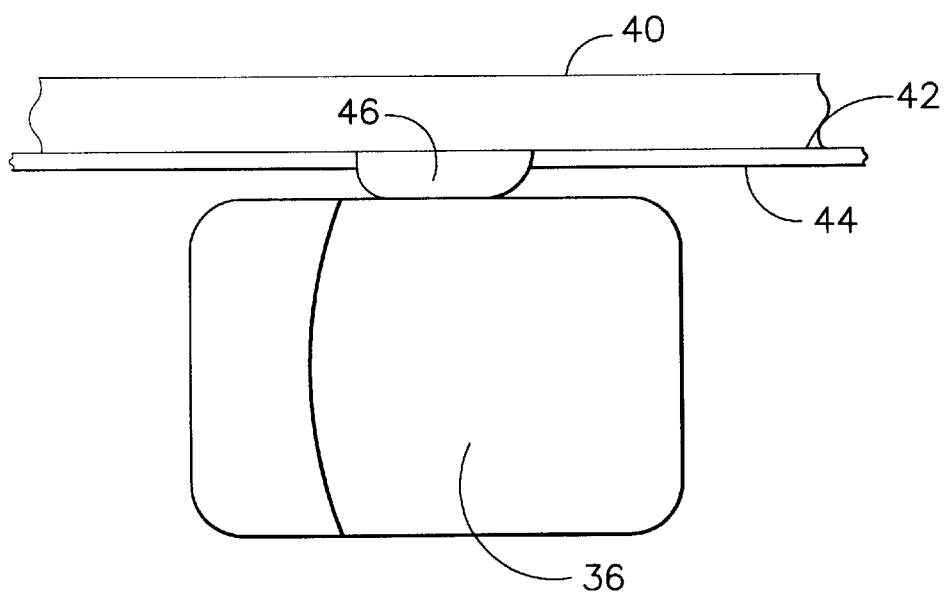
FIG. 5 is yet another partial plan view of the main deck 10 of passenger aircraft showing another embodiment of the inventive side wall mounted armrest.

FIG. 5 is another partial plan view of the main deck 10 of a passenger aircraft also showing the airplane's outer skin 40 and side wall 42 adjacent to which is shown a top view of an outermost seat 36. The illustrated embodiment may include a continuously running side wall track 44 similar conceptually to conventional seat tracks on which seat units are mounted to the cabin floor of an aircraft. Individual track mounted armrests 46 may be positioned immediately adjacent each outermost seat 36 providing occupant passengers the necessary comfortable arm rest and support means. The individual track mounted armrests 46 may be contoured and/or cushioned in three dimensions to provide an ergonomic armrest significantly improved over conventional armrests 18 illustrated in FIG. 2. Optionally, the areas of the side wall track 44 between individual track mounted armrests 46 may be covered with decorative cover strips of the type frequently used for passenger aircraft interiors, which are well known to those skilled in the art.

Figure 6:
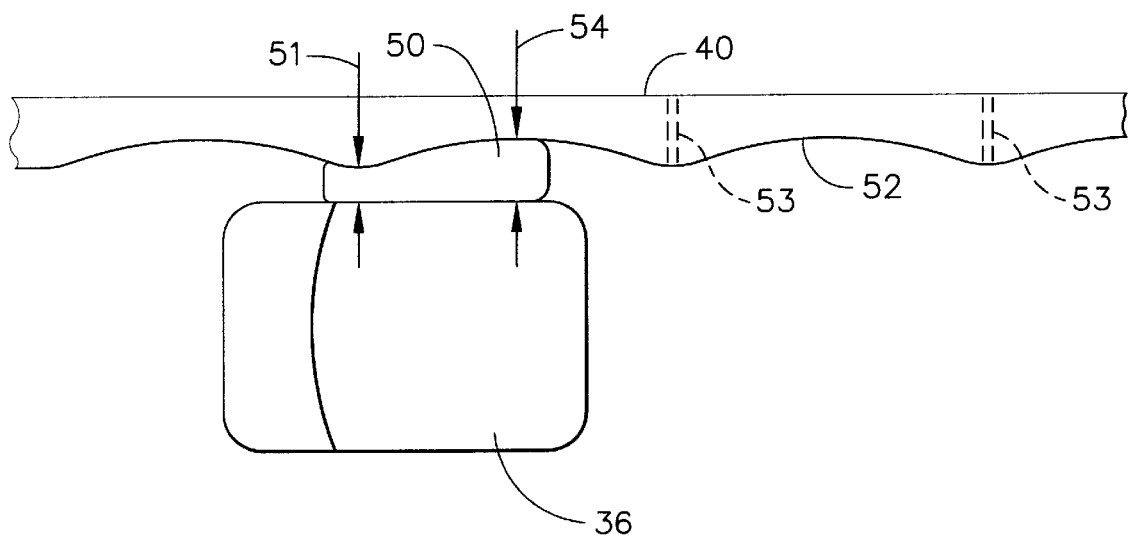
FIG. 6 is yet another partial plan view of the main deck 10 of passenger aircraft showing yet another embodiment of the inventive side wall mounted armrest.

FIG. 6 is another partial plan view of the main deck 10 of a passenger aircraft also showing the airplane's outer skin 40 and yet another embodiment comprised of contoured side wall panels 52 and a contoured armrest 50 adjacent to which is shown a top view of an outermost seat 36. The contoured armrest 50 may be recessed into the space between body frames 53 thereby increasing the armrest width between frames 54. With this additional width, it may also be possible to slightly reduce the armrest width at the frames 51. FIG. 6 illustrates an individual contoured armrest. Optionally, the armrest may be continuous.

Yet another embodiment of the inventive individual track mounted armrests 46 may be comprised of individual securing means, such as common aircraft type fasteners, for mounting said armrests to the side wall 42. By use of individual securing means, there would be no necessity for continuously running side wall tracks 44.

The embodiments shown and addressed herein are specifically illustrated as being used on the main deck of a representative Boeing 747 type aircraft. However, the inventive side wall supported armrest concept may be of equal benefit for other types of passenger aircraft in situations where it is desirable to improve passenger comfort by increasing available seat bottom widths.

Although the present invention has been described in considerable detail with reference to certain versions thereof, other versions are possible. Therefore, the spirit and scope of the appended claims should not be limited to the description of the versions contained therein.

We claim:

1. An aircraft passenger abreast seating arrangement, comprising:

two triple passenger abreast seating units;
   one quadruple passenger abreast seating unit;
   two aisles;
   seat mounted armrests on both sides of the two inboard seats of said triple passenger abreast seating units;
   seat mounted armrests on both sides of all seats of said quadruple passenger abreast seating unit; and
   a continuously running side wall supported armrest secured to the aircraft's side wall, said continuously running side wall supported armrest running along the aircraft's side wall at a height substantially equal to the seat mounted armrests on the two triple passenger abreast seating units;
   whereby use of said continuously running side wall supported armrests provides additional usable width in an aircraft's cross section, said additional width allowing an increase in seat bottom width.

2. The aircraft passenger abreast seating arrangement of claim 1, wherein said continuously running side wall supported armrest is secured to the aircraft's side wall by means of side wall track mounting means.

3. The aircraft passenger abreast seating arrangement of claim 1, wherein said continuously running side wall supported armrest is secured to the aircraft's side wall by means of conventional fasteners.

4. The aircraft passenger abreast seating arrangement of claim 1, wherein said continuously running side wall supported armrest incorporates suitable cushioning and contouring for passenger comfort.

5. An aircraft passenger abreast seating arrangement, comprising:

two triple passenger abreast seating units;
   one quadruple passenger abreast seating unit;
   two aisles;
   seat mounted armrests on both sides of the two inboard seats of said triple passenger abreast seating units;
   seat mounted armrests on both sides of all seats of said quadruple passenger abreast seating unit; and
   individual side wall supported armrests for outboard seats of said two triple passenger abreast seating units, said individual side wall supported armrests contoured to be recessed at least in part into the space between aircraft body frames;
   whereby use of said individual side wall supported armrests provides additional usable width in an aircraft's cross section, said additional width allowing an increase in seat bottom width.

6. An aircraft passenger abreast seating arrangement, comprising:

two triple passenger abreast seating units;
   one quadruple passenger abreast seating unit;
   two aisles;
   seat mounted armrests on both sides of all seating units except the outboard seats of the triple passenger abreast seating units; and
   a continuously running side wall supported armrest secured to the aircraft's side wall, said continuously running side wall supported armrest running along the aircraft's side wall at a height substantially equal to the seat mounted armrests on the two triple passenger abreast seating units;
   whereby use of said continuously running side wall supported armrest provides additional usable width on an aircraft's cross section, said additional width allowing an increase in seat bottom width.

7. A passenger abreast seating arrangement in an aircraft, comprising a plurality of seats abreast;
   seat mounted armrests on all but the outboard side of each outboard seat in said plurality of seats; and
   a continuously running side wall supported armrest secured to the aircraft's side wall, said continuously running side wall supported armrest running along the aircraft's side wall at a height substantially equal to the seat mounted armrests on said plurality of seats;
   whereby use of said continuously running side wall supported armrest serves as means for providing additional usable width on each side of said aircraft's cross section, and as means for allowing increased seat bottom width.

8. The aircraft passenger abreast seating arrangement of claim 7, wherein said continuously running side wall supported armrest is secured to the aircraft's side wall by means of side wall track mounting means.

9. The aircraft passenger abreast seating arrangement of claim 7, wherein said continuously running side wall supported armrest is secured to the aircraft's side wall by means of conventional fasteners.

10. The aircraft passenger abreast seating arrangement of claim 7, wherein said continuously running side wall supported armrest incorporates suitable cushioning and contouring for passenger comfort.

11. A passenger abreast seating arrangement in an aircraft, comprising:

a plurality of seats abreast;
    seat mounted armrests on all but the outboard side of each outboard seat in said plurality of seats; and
    individual side wall supported armrests for outboard seats of said plurality of seats, said individual side wall supported armrests contoured to be recessed at least in part into the space between aircraft body frames;
    whereby use of said individual side wall supported armrests serves as means for providing additional usable width on each side of an aircraft's cross section, and as means for allowing increased seat bottom width.

12. A method of increasing the usable width on each side of an aircraft's cross section, said method comprising the steps of:

mounting passenger armrests on both sides of each seat of triple passenger abreast seating units on either side of said cross section except for the outboard side of the outboard seat of each of said triple seating units;
    mounting a continuously running side wall supported armrest secured to an aircraft's side wall, said continuously running side wall supported armrest running along the aircraft's side wall at a height substantially equal to the mounted passenger armrests on the triple passenger abreast seating units; and providing additional usable width on each side of said aircraft's cross section by eliminating one seat mounted armrest, thus serving as means for enabling an increase in seat bottom width.

13. The method of claim 12, further comprising the step of mounting contoured passenger armrests on the outboard seat of said triple abreast seating units, and recessing, at least in part, said armrest into the contoured area between aircraft body frames.

14. An aircraft passenger abreast seating arrangement, comprising:

two triple passenger abreast seating units;

one quadruple passenger abreast seating unit;

two aisles;

seat mounted armrests on both sides of all seating units except the outboard seats of the triple passenger abreast seating units; and individual side wall supported armrests for outboard seats of said two triple passenger abreast seating units, said individual side wall supported armrests secured to the aircraft's side wall by means of side wall track mounting means, said individual side wall supported armrests contoured to be recessed at least in part into the space between aircraft body frames, said individual side wall supported armrests contoured and cushioned in three dimensions to provide an ergonomic armrest; and decorative cover strips to cover the areas of the side wall track mounting means between the individual side wall supported armrests;

whereby use of said individual side wall supported armrests provides additional usable width on an aircraft's cross section, said additional width allowing an increase in seat bottom width.

15. An aircraft passenger abreast seating arrangement, comprising:

two outboard passenger abreast seating units;

one center passenger abreast seating unit;

two aisles;

seat mounted armrests on both sides of all seating units except the outboard seats of the outboard passenger abreast seating units; and individual side wall supported armrests for outboard seats of said two outboard passenger abreast seating units, said individual side wall supported armrests secured to the aircraft's side wall by means of side wall track mounting means, said individual side wall supported armrests contoured to be recessed at least in part into the space between aircraft body frames, said individual side wall supported armrests contoured and cushioned in three dimensions to provide an ergonomic armrest; and decorative cover strips to cover the areas of the side wall track mounting means between the individual side wall supported armrests;

whereby use of said individual side wall supported armrests provides additional usable width on an aircraft's cross section, said additional width allowing an increase in seat bottom width.

* * * * *